United States Patent [19]

Ishida et al.

[11] Patent Number: 5,161,243
[45] Date of Patent: Nov. 3, 1992

[54] TRACKING SYSTEM FOR AN OPTICAL RECORDING/REPRODUCING APPARATUS HAVING A PLURALITY OF LIGHT SPOTS

[75] Inventors: Takashi Ishida, Osaka; Shunji O'Hara, Higashiosaka; Kenzo Ishibashi, Moriguchi; Toshio Satoh, Hirakata, all of Japan

[73] Assignee: Matsushita Electric Industrial Co., Ltd., Osaka, Japan

[21] Appl. No.: 3,801

[22] Filed: Jan. 16, 1987

[30] Foreign Application Priority Data

Jan. 21, 1986 [JP] Japan .................. 61-10818
Mar. 4, 1986 [JP] Japan .................. 61-46530

[51] Int. Cl.$^5$ ................................. G11B 7/09
[52] U.S. Cl. ................. 369/44.25; 369/44.32; 369/44.35; 369/44.37
[58] Field of Search .................. 369/44–46, 369/100, 106, 109, 111, 112, 117, 124, 44.25, 44.29, 44.31, 44.32, 44.33, 44.35, 44.37, 44.38; 250/201, 201.1, 201.5

[56] References Cited

U.S. PATENT DOCUMENTS

| | | | |
|---|---|---|---|
| 4,406,000 | 9/1983 | Shoji et al. | 369/44 |
| 4,414,655 | 11/1983 | Shoji et al. | 369/44 |
| 4,476,555 | 10/1984 | Joichi et al. | 369/44 |
| 4,561,080 | 12/1985 | Yamazaki | 369/46 X |
| 4,566,088 | 1/1986 | Yoshida et al. | 369/44 |
| 4,587,644 | 5/1986 | Fujiie | 369/46 X |
| 4,613,961 | 9/1986 | Aarts | 369/44 |
| 4,627,039 | 12/1986 | Meyer | 369/44 |
| 4,659,972 | 4/1987 | Uchikoshi et al. | 369/44 X |

*Primary Examiner*—Roy N. Envall, Jr.
*Assistant Examiner*—W. R. Young
*Attorney, Agent, or Firm*—Stevens, Davis, Miller & Mosher

[57] ABSTRACT

In an optical recording and reproducing apparatus which forms at least first and second light spots on a track of an optical recording medium to record, reproduce or erase information, a movable range of the second light spot is limited to less than one half of a track pitch, normal to the track, from the track to prevent tracks other than a target gtrack from being miserased, misrecorded or misreproduced. When a deviation of the second light spot from the target track exceeds a predetermined amount, light emission of the second light spot is stopped to prevent a track other than the target track from being miserased, misrecorded, or misreproduced. When the deviation of the second light spot from the target track exceeds the predetermined amount, the second light spot is returned to a neutral position to prevent a track other than the target track from being miserased, misrecorded, or misreproduced.

4 Claims, 12 Drawing Sheets

TRACKING SYSTEM FOR AN OPTICAL RECORDING/REPRODUCING APPARATUS HAVING A PLURALITY OF LIGHT SPOTS

BACKGROUND OF THE INVENTION

1. Field of the Invention

The present invention relates to an optical recording and reproducing apparatus having a plurality of light spots which can repetitively record and reproduce a signal by light irradiation.

2. Description of the Related Art

A prior art rewritable optical recording and reproducing apparatus having a plurality of light spots is shown in FIG. 15.

Numeral 3 denotes an information track on a recording medium, numeral 7 denotes a recording light source having a wavelength $\lambda_1$, numeral 13 denotes an erasing light source having a wavelength $\lambda_2$, numerals 8 and 14 denote collimating lenses, numerals 9 and 16 denote wavelength separation filters which transmit light of wavelength $\lambda_1$ and reflect light of wavelength $\lambda_2$, numeral 10 denotes a polarization beam splitter, numeral 11 denotes a $\lambda_1/4$ plate, numeral 15 denotes $\lambda_2/4$, numeral 12 denotes an objective lens, and numerals 18 and 19 denote photo-detectors. Light emitted from the recording light source 7 advances as shown by a solid line and forms a recording light spot L on the information track 3 to record and reproduce information, and reflected light therefrom is directed to the photo-detector 18 which generates a focus error signal ($FE_L$) and a tracking error signal ($TE_L$). Light emitted from the erasing light source 13 advances as shown by a broken line and forms an erasing light spot M on the track 3 to erase the information. Most portions of the reflected light therefrom is directed to the photo-detector 19 which generates a tracking error signal ($TE_M$) of the erasing light spot M.

An optical system is arranged such that the light spots L and M are on a line which is essentially parallel to the track 3. An objective lens drive element 20 is arranged on the objective lens 12 so that known focus control and tracking control are effected for the recording light spot L by the signals $FE_L$ and $TE_L$. In the control, the erasing light spot M is also controlled in the same manner and moved by the same distance as the recording light spot. A rotatable mirror 22 is arranged in a light path of the erasing light spot M so that the erasing light spot M is independently movable in a direction normal to the track 3. The tracking error signal $TE_M$ of the erasing light spot M derived from the photo-detector 19 through a differential amplifier 24 is supplied to a driver circuit 26 through a phase compensation circuit 25, and supplied to a driver 23 to drive the rotatable mirror 22 to independently control tracking of the erasing light spot M.

In the above arrangement, after the recording light spot L has been scanned, the erasing light spot M is scanned so that the two spots L and M can be tracked to one track. In this manner, a relative positional deviation of the two light spots L and M can be prevented.

The drive means for moving the light spot M normal to the track may be implemented by moving the erasing light source 13 by a piezoelectric element or arranging a rotatable prism in the light path.

However, in the above arrangement, if the light spot deviates from the center of the target track currently being scanned by more than ½ track pitch normal to the track when an external disturbance is applied, a tracking error signal is no longer an error signal for the target object and a track other than the target track is scanned. As a result, a track other than the target track may be miserased, misrecorded or misreproduced.

SUMMARY OF THE INVENTION

It is an object of the present invention to provide an optical recording and reproducing apparatus having a plurality of light spots, which does not miserase, misrecord or misreproduce any track other than the target track even if an external disturbance is applied.

The optical recording and reproducing apparatus of the present invention comprises means for forming at least a first light spot and a second light spot on one track of an optical recording medium, first deviation detection means for detecting a first deviation between the first light spot and the track, first drive means for moving the first light spot and the second light spot together in accordance with the first deviation, second deviation detection means for detecting a second deviation between the second light spot and the track, second drive means for moving the second light spot relative to the first light spot, and means for limiting a movable range of the second light spot by the second drive means to less than one half of a track pitch, normal to the track, from the position of the second light spot taken when the second drive means is at a neutral position.

The present apparatus further comprises means for stopping the irradiation of the second light spot when the second deviation exceeds a predetermined amount.

The present apparatus further comprises means for returning the second drive means to the neutral position when the second deviation exceeds the predetermined amount.

In accordance with the present invention, the second light spot is restricted such that it does not move more than one half of the track pitch from the track. Accordingly, even if an external disturbance is applied, a track other than the target track is not scanned and a track other than the target track is prevented from being miserased, misrecorded or misreproduced.

DESCRIPTION OF THE PREFERRED EMBODIMENTS

Figure 1A:
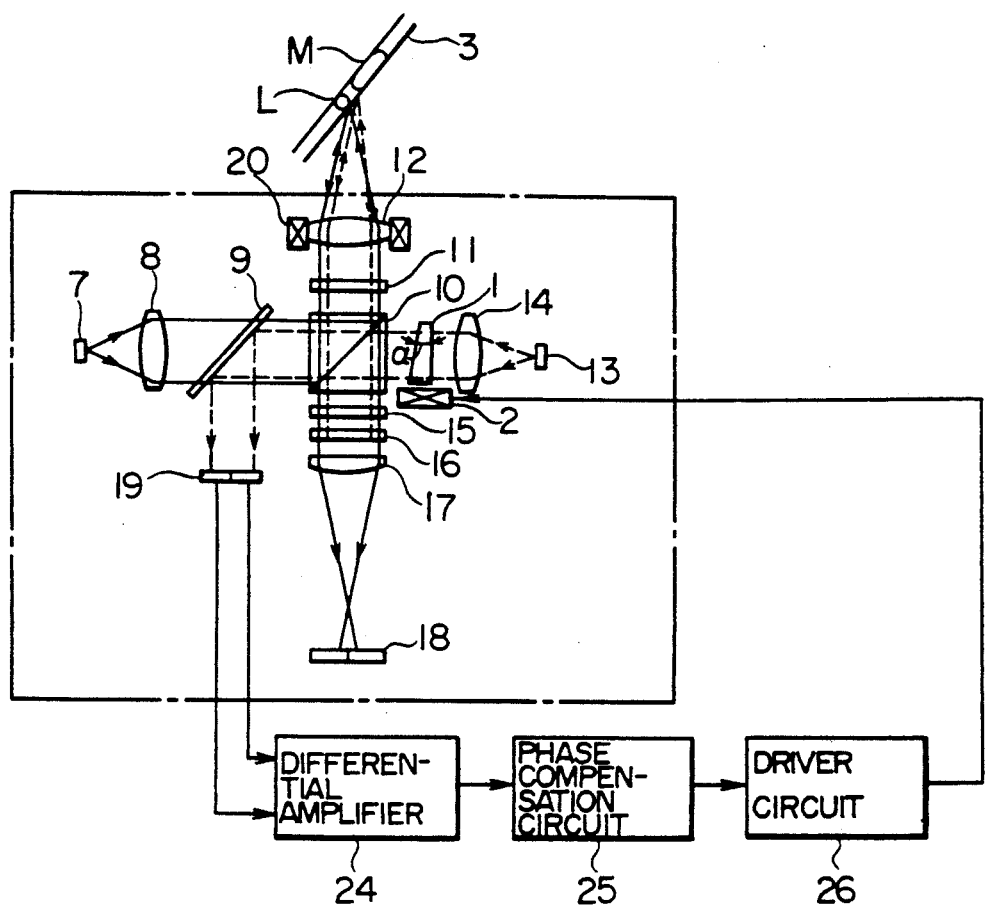
FIGS. 1A, 1B and 2A, 2B show first and second embodiments in which means for limiting a movable range of a light spot constitutes a mechanical means.
Figure 1B:
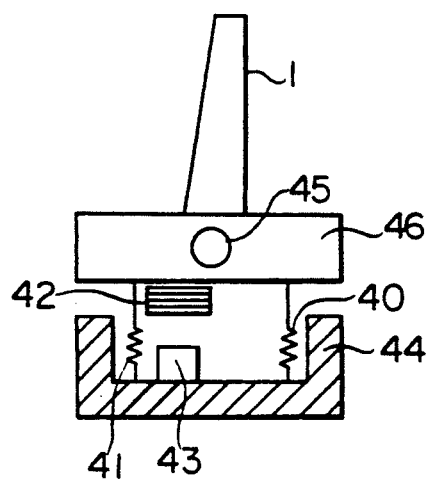
Figure 15:
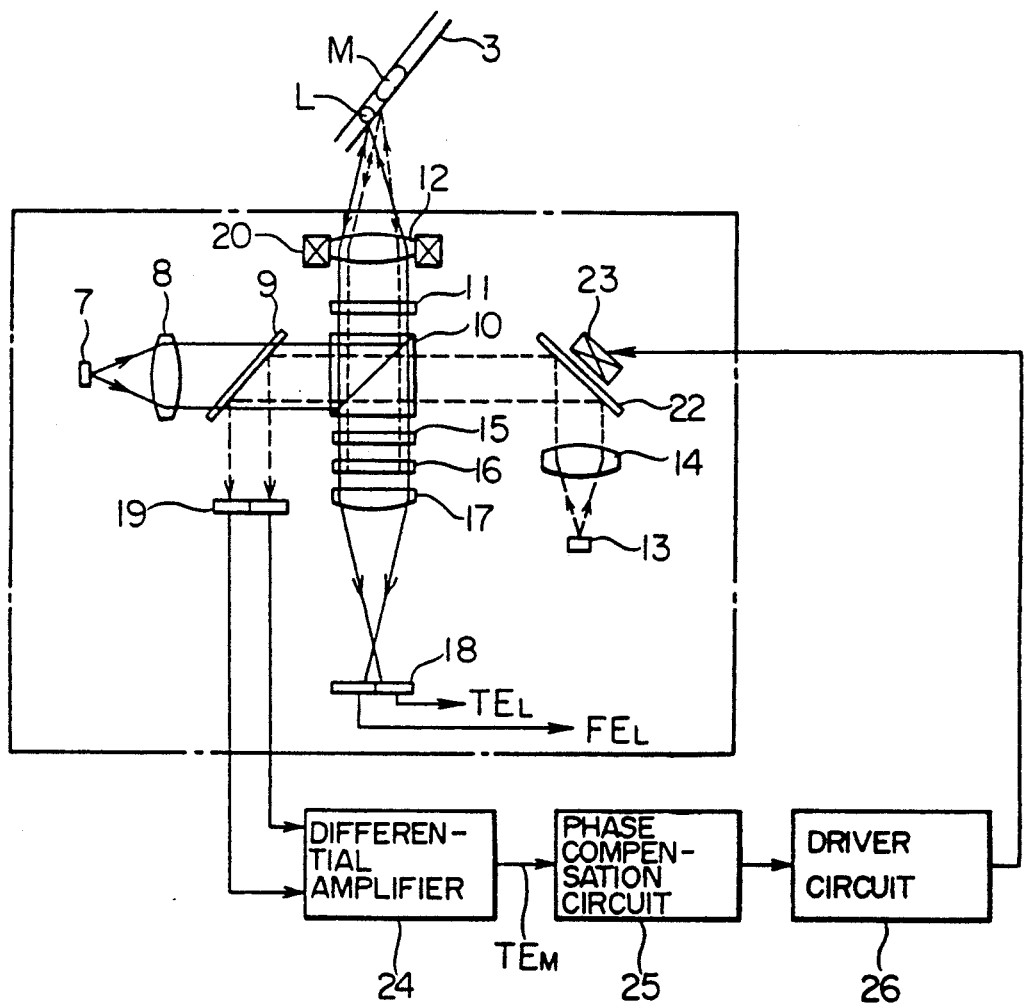
FIG. 15 shows a prior art optical recording and reproducing apparatus.

FIG. 1A shows a first embodiment of the present invention. Like elements to those shown in FIG. 15 are designated by like numerals. Numeral 1 denotes a prism having an apex angle α, and numeral 2 denotes a drive device for the prism 1. An optical system is adjusted such that when the prism 1 is at a neutral position, light spots L and M are formed on one track. Normally, the light spots L and M are spaced by an error l normal to the track, where l is smaller than an allowable error $l_0$ for a positional deviation between the light spots L and M. FIG. 1B shows an embodiment of the prism 1 and the drive device 2. The prism 1 is attached to a member 46 and is rotatable around a shaft 45. The member 46 is connected to a limit member 44 by springs 40 and 41. The member 46 is provided with a coil 42 and the limit member 44 is provided with a magnet.

By applying a voltage to the coil 42, an attracting force or expelling force is produced to the magnet 43 to rotate the prism 1 around the shaft 45. The limit member 44 is positioned such that a movable range of the light spot M by the rotation of the prism 1 is less than one half of a track pitch, normal to the track, from the position of the light spot M taken when the prism 1 is at a neutral position.

When the light spot L is scanned to the track 3, the position of the light spot M when the prism 1 is at the neutral position deviates by l from the center of the track 3. Accordingly, in order to limit the light spot M from being moved more than one half of the track pitch from the center of the track 3, it is necessary to limit the movable range of the light spot M to less than $d/2 - l_0$ (where d is the track pitch and $l_0$ is an allowable error for the positions of the spots L and M) from the position of the light spot M when the prism 1 is at the neutral position. However, the positional error l between the light spots L and M is, in most cases, not close to the allowable error $l_0$ and is very small. Accordingly, a sufficient effect is attained if the movable range of the light spot M is limited to less than one half of the track pitch from the position of the light spot M when the prism 1 is at the neutral position. With such an arrangement, the light spot M does not deviate more than one half of the track pitch from the target track even if an external disturbance is applied and a track other than the target track is prevented from being scanned by the light spot M and therefore from being miserased.

Figure 2A:
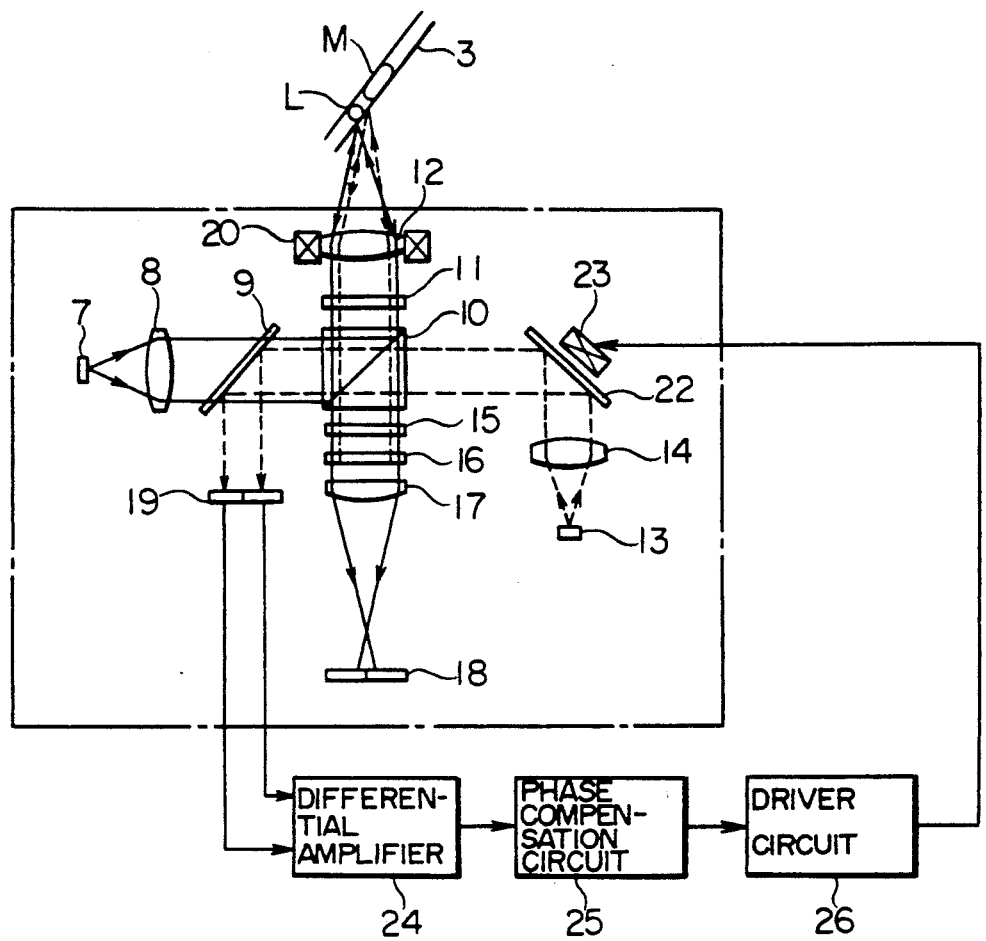
Figure 2B:
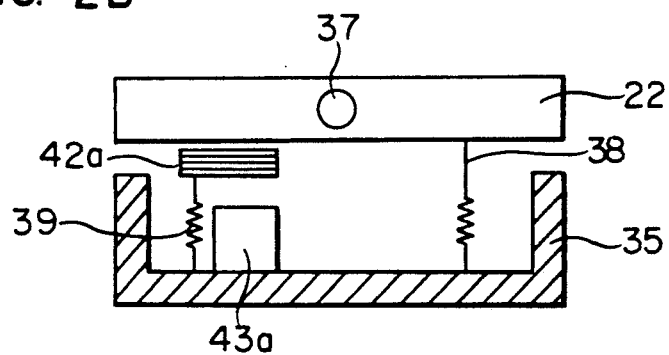

FIG. 2A shows a second embodiment of the present invention. Like elements to those shown in FIG. 15 are designated by like numerals. Numeral 22 denotes a rotatable mirror and numeral 23 denotes a drive device therefor. The optical system is adjusted such that when the rotatable mirror 22 is at the neutral position, the light spots L and M are formed on one track. Normally, the light spots L and M are spaced by the error l normal to the track, where l is smaller than the allowable error $l_0$. FIG. 2B shows an embodiment of the rotatable mirror 22 and the drive device 23. The rotatable mirror 22 is rotatable around a shaft 37 and is connected to a limit member 35 by springs 38 and 39. The rotatable mirror 22 is provided with a coil 42a, and the limit member 35 is provided with a magnet 43a. When a voltage is applied to the coil 42a, an attracting or expelling force to the magnet 43a is produced to rotate the rotatable mirror 22. The limit member 35 is set to limit the rotation of the rotatable mirror 22 such that the movable range of the light spot M is less than one half of the track pitch, normal to the track, from the position of the light spot M taken when the rotatable mirror 22 is at the neutral position. With such an arrangement, the light spot M does not deviate more than one half of the track pitch from the target track even if the external disturbance is applied, and a track other than the target track is prevented from being scanned by the light spot M and therefore from being miserased.

In the first and second embodiments, the movable range of the light spot M is limited by the mechanical device. The member for limiting the movable range need not be constructed as shown in the above embodiments so long as it can limit the movable range of the light spot M to less than one half of the track pitch, normal to the track, from the position of the light spot M taken when the drive device is at the neutral position.

Figure 3A:
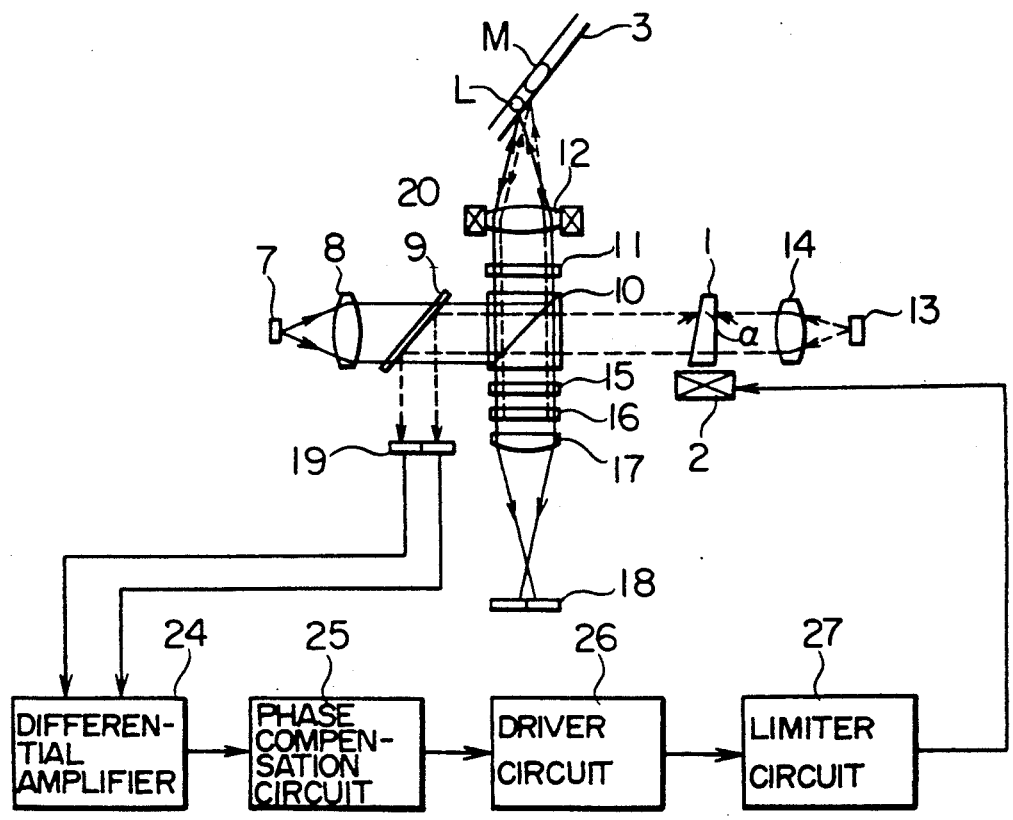
FIGS. 3A, 3B and 4A, 4B show third and fourth embodiments in which means for limiting the movable range of the light spot constitutes an electrical means.

FIG. 3A shows a third embodiment. Like elements to those shown in FIG. 15 are designated by like numerals. The optical system is adjusted such that the light spots L and M are formed on one track when the prism 1 is at the neutral position. Normally, the light spots L and M are spaced by the error l, normal to the track, where l is smaller than the allowable error $l_0$.

Figure 3B:
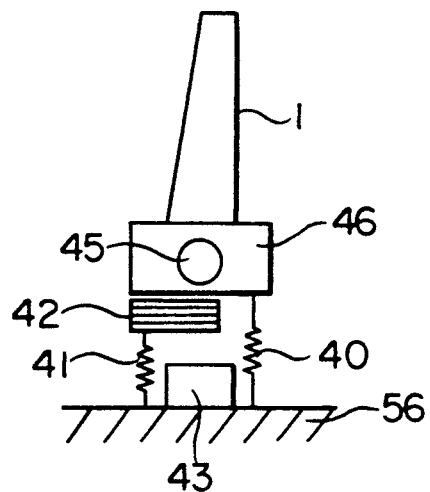

FIG. 3B shows an embodiment of the prism 1 and the drive device 2. In FIG. 3B, the prism 1 is attached to a member 46 which is rotatable around a shaft 45. The member 46 is attached to a base 56 by springs 40 and 41. Numeral 42 denotes a coil and numeral 43 denotes a magnet. When a voltage is applied to the coil 42, the prism 1 rotates around the shaft 45 to move the light spot M. The voltage to the coil 42 is supplied from a limiter circuit 27 of FIG. 3A.

Figure 5:
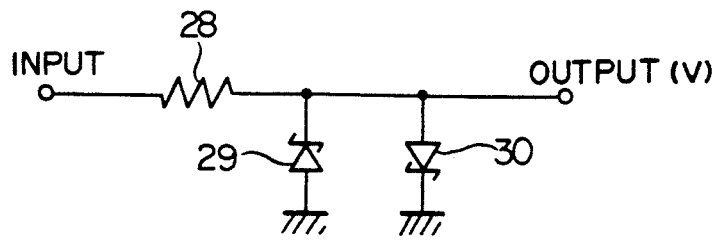
FIG. 5 shows a circuit diagram of a limit circuit.

Referring to FIG. 3A, the limiter circuit 27 limits the range of the output voltage (V) thereof to $-V_- \leq V \leq V_+$. FIG. 5 shows a specific circuit of the limiter circuit 27. In FIG. 5, numeral 28 denotes a resistor, and numerals 29 and 30 denote zener diodes. A zener voltage of the zener diode 29 is selected to be $V_+$, and a zener voltage of the zener diode 30 is selected to be $V_-$. Thus, the range of the output voltage (V) is $-V_- \leq V \leq V_+$. The limiter circuit 27 may be implemented by such a simple configuration.

A distance of movement of the light spot M from the neutral position (the position of the light spot M taken when the prism 1 is at the neutral position, that is, when the drive voltage is zero) after the drive voltage $V_+$ (or $-V_-$) is applied is represented by $lv_+$ (or $lv_-$). Thus, the limiter circuit 27 is designed to produce the drive voltage $V_+$ (or $V_-$) which results in $lv_+ < d/2$ (or $lv_- < d/2$), where d is the track pitch, so that the movable range of the light spot M can be limited to less than one half of the track pitch from the position of the light spot M taken when the prism 1 is at the neutral position. With this arrangement, the light spot M does not deviate more than one half of the track pitch from the target track even if an external disturbance is applied, and a track other than the target track is prevented from being scanned by the light spot M and therefore from being miserased.

Figure 4A:
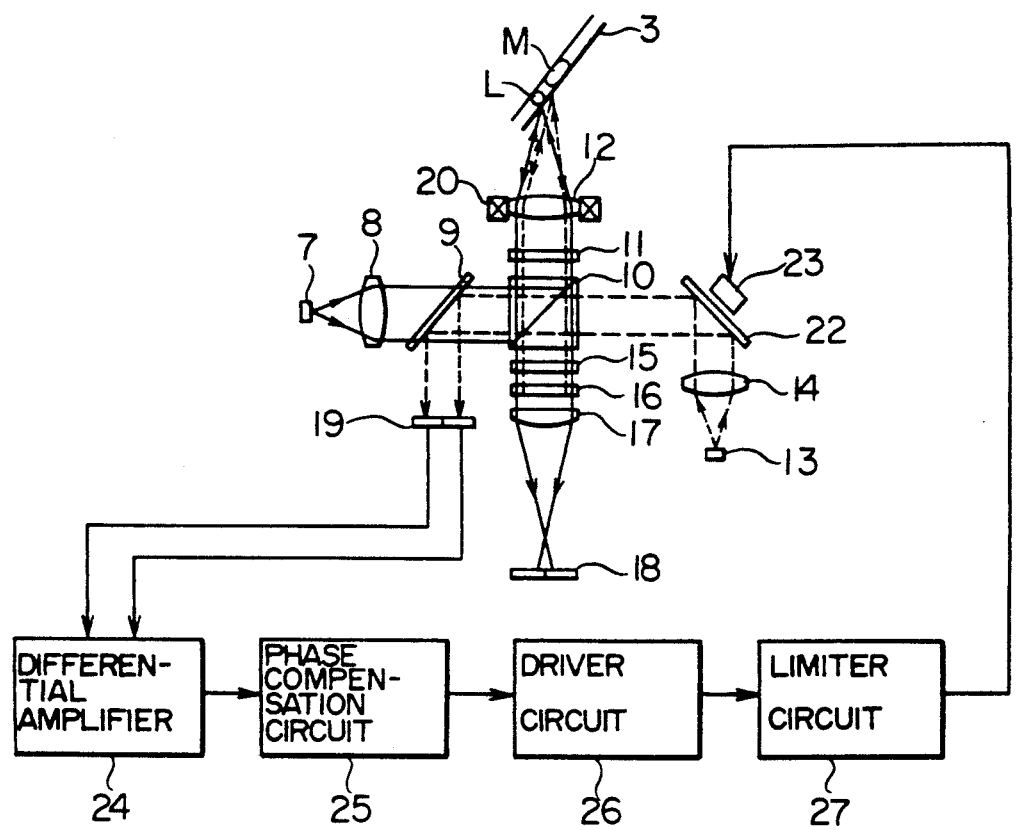
Figure 4B:
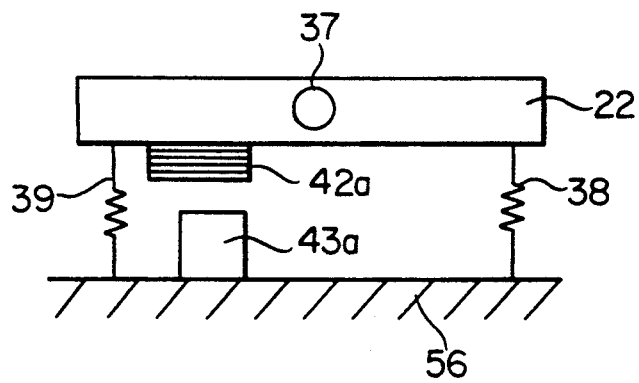

In the third embodiment, the drive device for the light spot M is the prism. Alternatively, it may be a rotatable mirror. This is shown in FIG. 4A as a fourth embodiment. Like elements to those shown in FIG. 3 are designated by like numerals. Numeral 22 denotes a rotatable mirror and numeral 23 denotes a drive device therefor. An embodiment of the rotatable mirror is shown in FIG. 4B. When a voltage is applied to a coil 42a, an attracting or expelling force to a magnet 43a is produced to rotate the rotatable mirror 22 around a shaft 37 to move the light spot M. In the fourth embodiment, the same advantage as that of the third embodiment is attained.

In the third and fourth embodiments, the movable range of the light spot M is limited by the electrical device.

As explained in connection with the first embodiment, if the movable range of the light spot M is set to be less than $d/2-l_0$ (where $l_0$ is the allowable error of the positional deviation between the light spots L and M), the light spot M will not deviate more than $d/2$ from the center of the target track even if an external disturbance is applied. However, taking the tracking ability of the light spot M into account, it is preferable that the movable range of the light spot M is wide. Accordingly, the movable range of the light spot M may be larger than $d/2-l_0$ from the position of the light spot M taken when the drive means is at the neutral position. In this case, the light spot M may deviate more than $d/2$ from the center of the target track when the external disturbance is applied.

This is discussed for the case where the movable range of the light spot M is limited by the electrical device. In FIG. 3, the drive voltage is limited to $-V_-\leq V \leq V_+$ by the limiter circuit. The movable range of the light spot M from the track is given by $d/2-l_1+l_2>d/2$, where the distance of the light spot M from the neutral position corresponding to $V_+$ is given by $lv_+=d/2-l_1$ and the setting error of the light spots L and M is given by $l_2$ ($l_2>l_1$). Thus, when the external disturbance is applied, the light spot M is moved more than one half of the track pitch from the center of the track and a tracking error signal is produced for an adjacent track. Thus, the drive voltage may remain at $V_+$ (or $-V_-$) so that the adjacent track is scanned. In this case, the light spot M is kept deviated from the target track and the adjacent track may be influenced.

Figure 6:
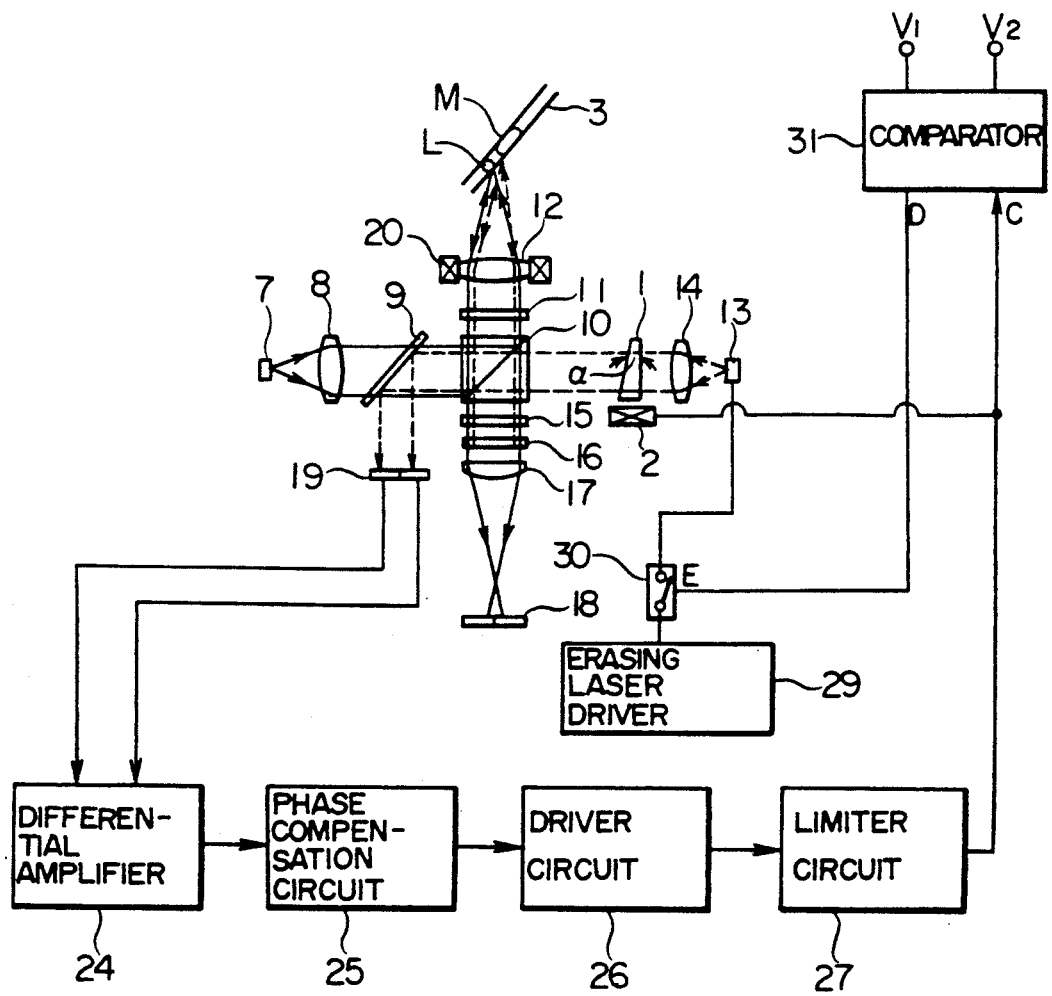
FIGS. 6, 7, 11 and 12 show embodiments for stopping the light emission of a light source of a light spot when a deviation of the light spot from a target track exceeds a predetermined amount.

An approach to resolve the above problem is discussed in FIG. 6 which shows a fifth embodiment. Like elements to those shown in FIG. 3A are designated by like numerals. The drive device 2 for the prism 1 may be constructed as shown in FIG. 3B. Numeral 31 denotes a comparator. When an input $V_c$ from a terminal C is $-V_1<V_c<V_2$, an output D is "H", and when $V_c\leq -V_1$ or $V_c\geq V_2$, the output D is "L". A switch 30 is turned on when an input E is "H", and turned off when the input E is "L" so that a current from an erasing laser driver 29 is selectively supplied to an erasing laser 13. Accordingly, if $V_1\leq V_-$ and $V_2\leq V_+$ are met, the erasing laser is deactivated before the output from the limiter circuit 27 reaches the limit voltage $-V_-$ or $V_+$. Thus, other track than the target track is prevented from being scanned by the light spot M and therefor from being miserased even if any setting error of the light spots L and M is generated or the external disturbance lasts for a long time.

Figure 7:
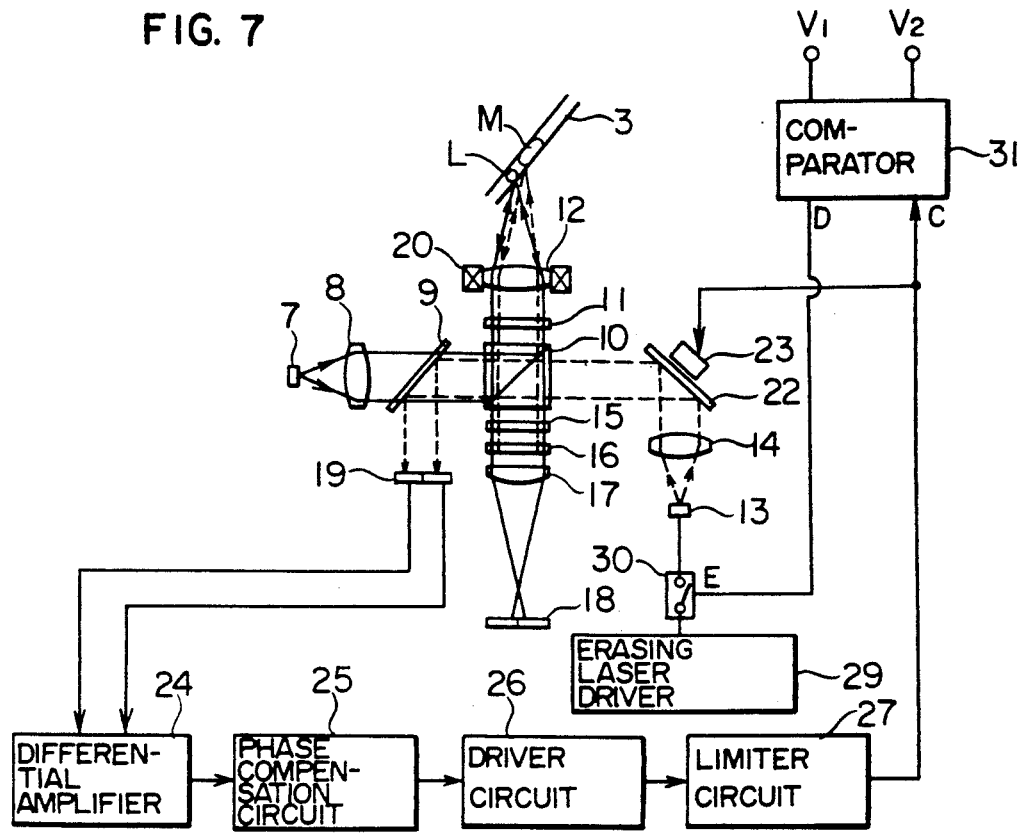

FIG. 7 shows a sixth embodiment in which the drive device for the light spot is a rotatable mirror. Like elements to those shown in FIG. 6 are designated by like numerals. The drive device for the rotatable mirror may be constructed as shown in FIG. 4B. With this arrangement, the same advantage as that of the fifth embodiment is attained.

Figure 8:
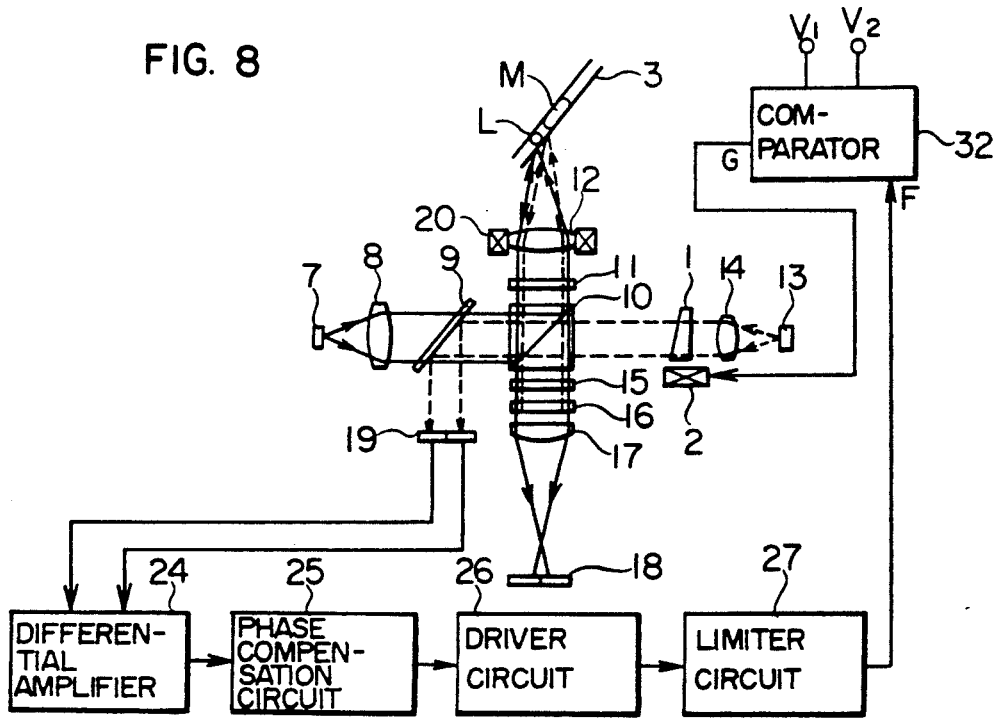
FIGS. 8, 9, 13 and 14 show embodiments for returning the drive means for the light spot M to a neutral position when the deviation of the light spot M from the track 3 exceeds the predetermined amount.

Instead of deactivating the erasing laser, the drive voltage may be reset to zero. This is shown in FIG. 8 as a seventh embodiment. Like elements to those shown in FIG. 6 are designated by like numerals. Numeral 32 denotes a comparator. When an input $V_F$ from a terminal F is $-V_1\leq V_F\leq V_2$, the input $V_F$ is reproduced as it is from the terminal G, and when $V_F\leq -V_1$ or $V_F\geq V_2$, the output at the terminal G is zero. Thus, if $V_1\leq V_-$ and $V_2\leq V_+$ are met, the drive voltage of the drive element will be zero before the output from the limiter circuit 27 reaches the limit voltage $-V_-$ or $V_+$. Accordingly, the tracking error signal is always for the target track and a track other than the target track is prevented from being scanned by the light spot M and therefore from being miserased.

Figure 9:
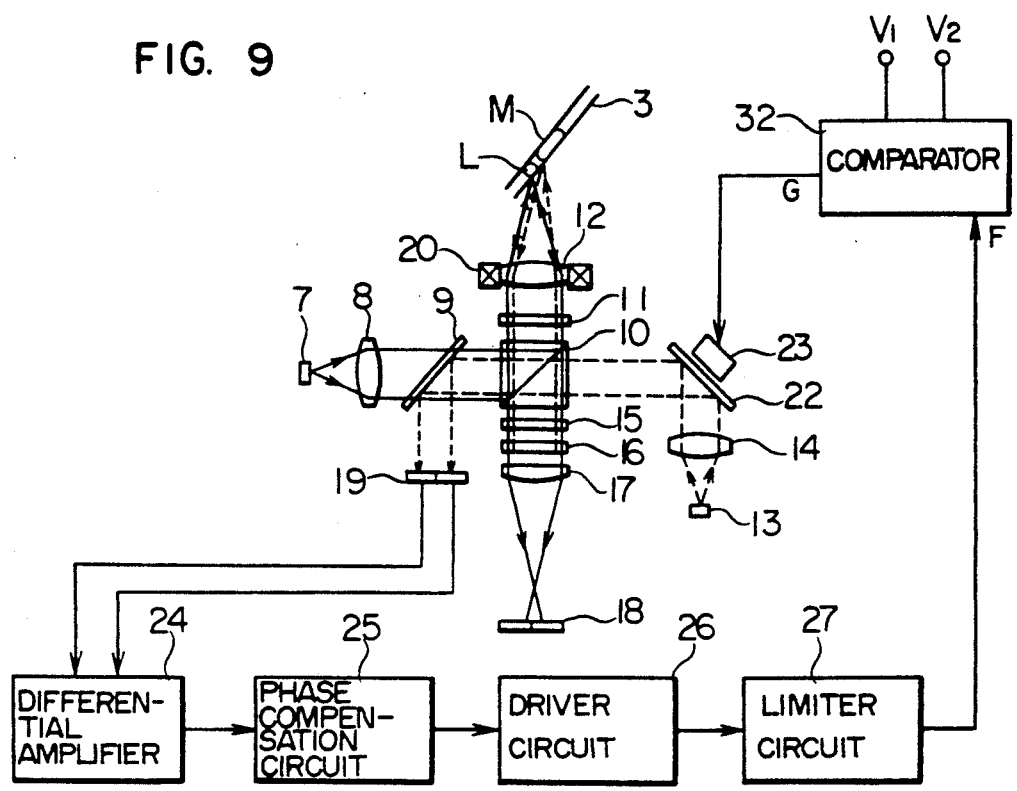

FIG. 9 shows an eighth embodiment which uses a rotatable mirror. The same advantage as that of the seventh embodiment is attained.

Figure 10:
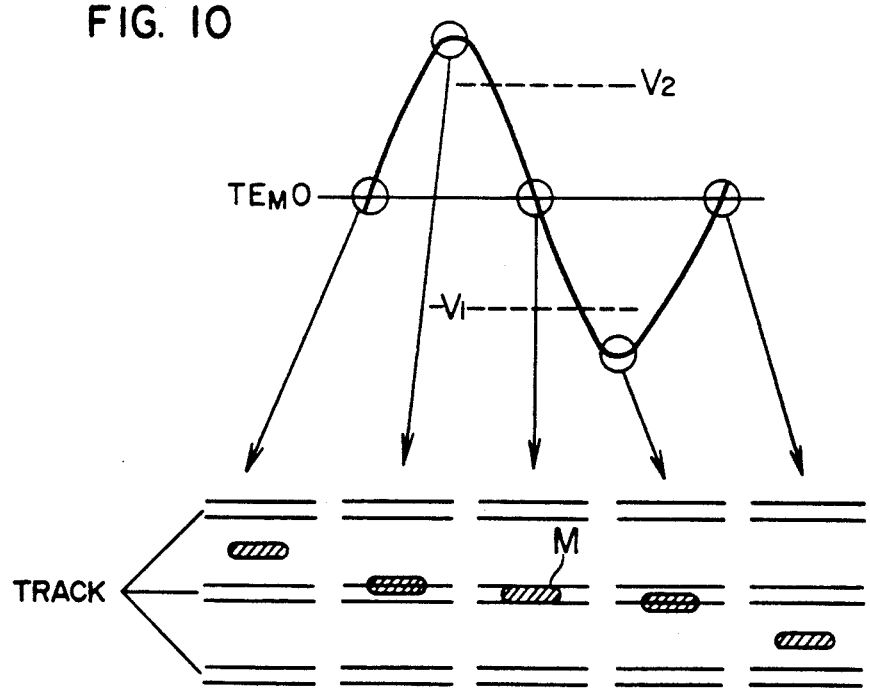
FIG. 10 illustrates a tracking error signal and a light spot position.
Figure 11:
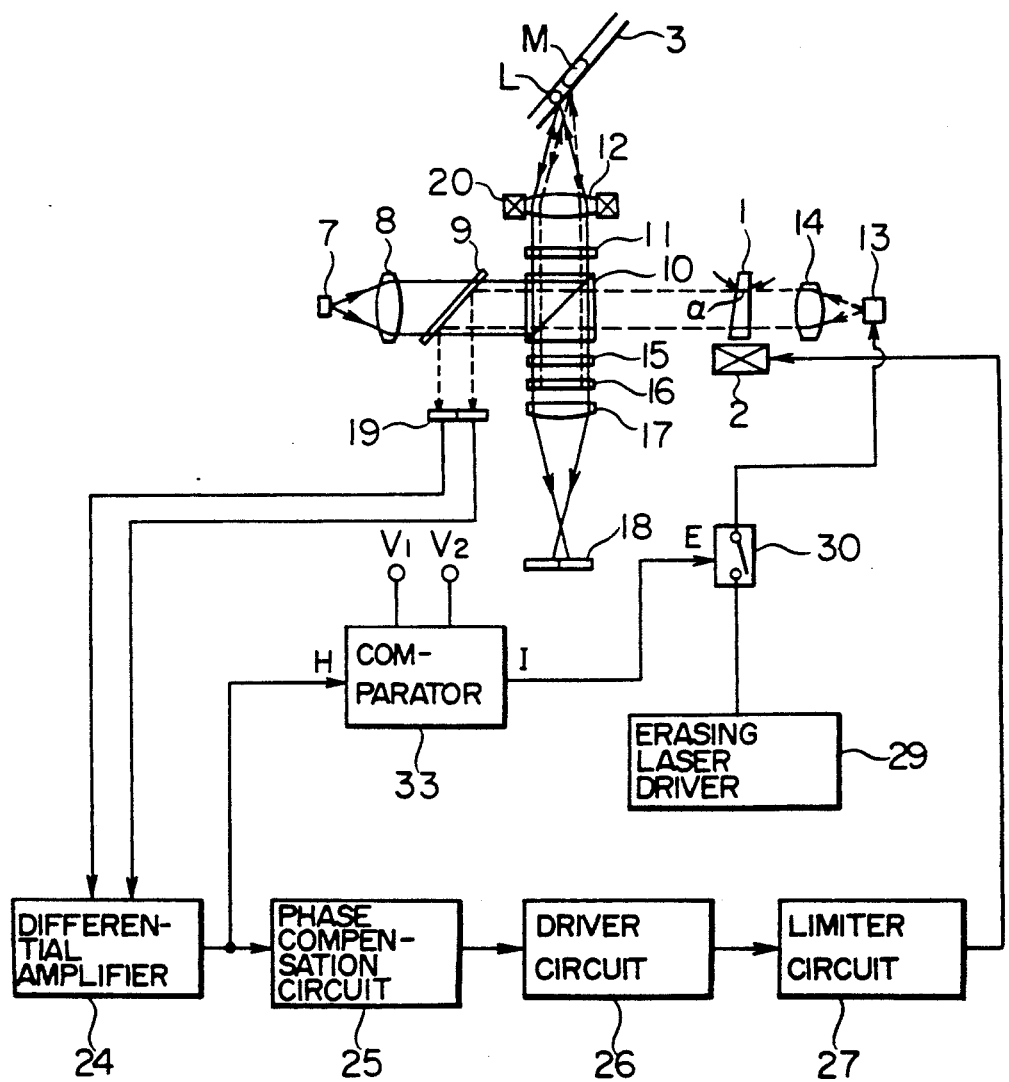

In the above embodiments, the drive voltage to the drive element is detected, and if the erasing light spot M deviates by approximately one half of the track pitch from the center of the track, the erasing laser is deactivated or the drive voltage is reset to zero. Alternatively, the deviation of the erasing light spot M may be detected directly from a tracking error signal $TE_M$. FIG. 10 shows a relationship between the position of the erasing light spot M and $TE_M$. FIG. 11 shows a ninth embodiment in which the deviation of the erasing light spot is detected from $TE_M$. Like elements to those shown in FIG. 6 are designated by like numerals. The operation is explained below. The $TE_M$ produced by a photodetector 19 and a differential amplifier 24 is applied to a comparator 33. When $-V_1\leq TE_M\leq V_2$, the comparator 33 produces "H" at a terminal I so that a switch 30 is turned on and an erasing laser emits a light. When $TE_M\leq -V_1$ or $TE_M\geq V_2$, the output I is "L", and the switch 30 is turned off and the erasing laser is deactivated.

By appropriately setting $V_1$ and $V_2$ as shown in FIG. 10, the erasing laser is deactivated before the deviation of the erasing light spot M from the center of the target track reaches one half of the track pitch, and a track other than the target track is prevented from being scanned by the light spot M and therefore from being miserased.

Figure 12:
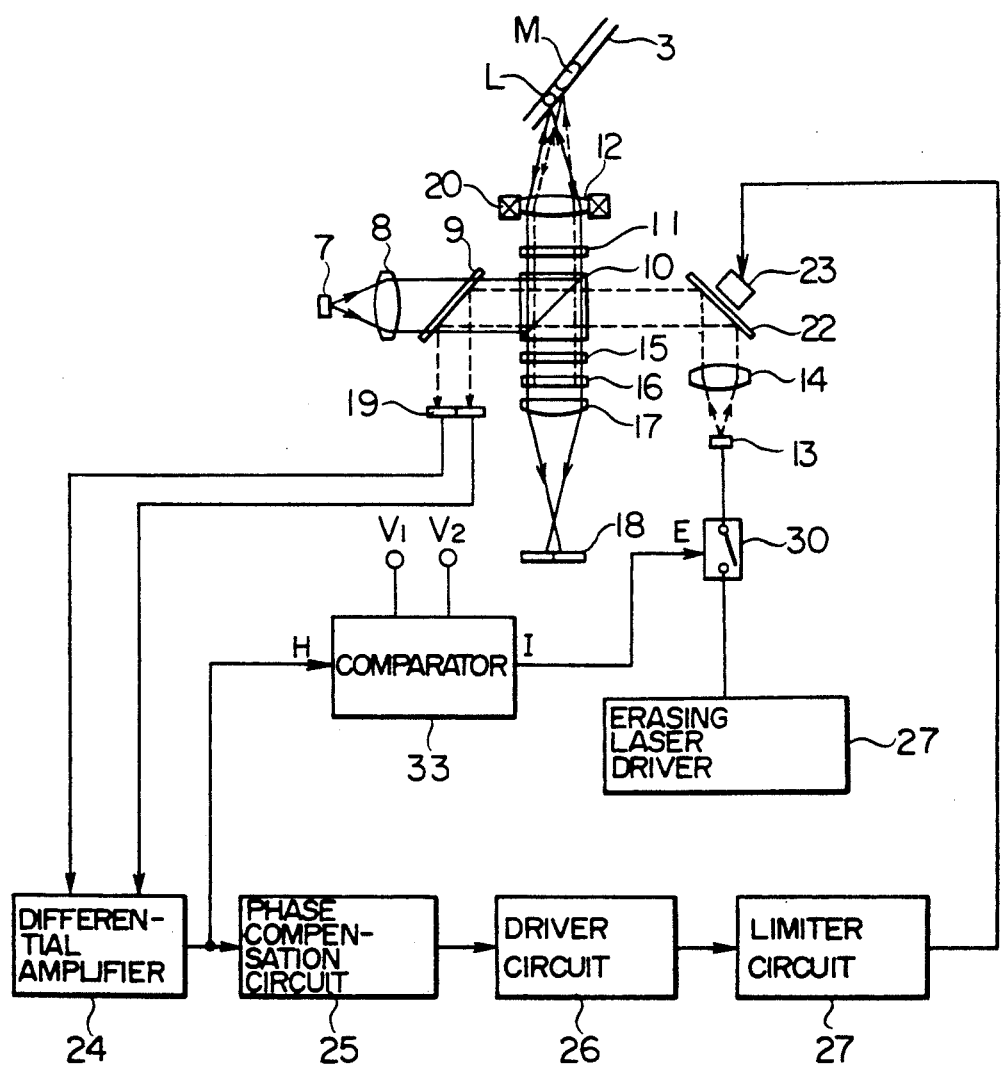

FIG. 12 shows a tenth embodiment which uses a rotatable mirror. The same advantage as that of the ninth embodiment is attained.

Figure 13:
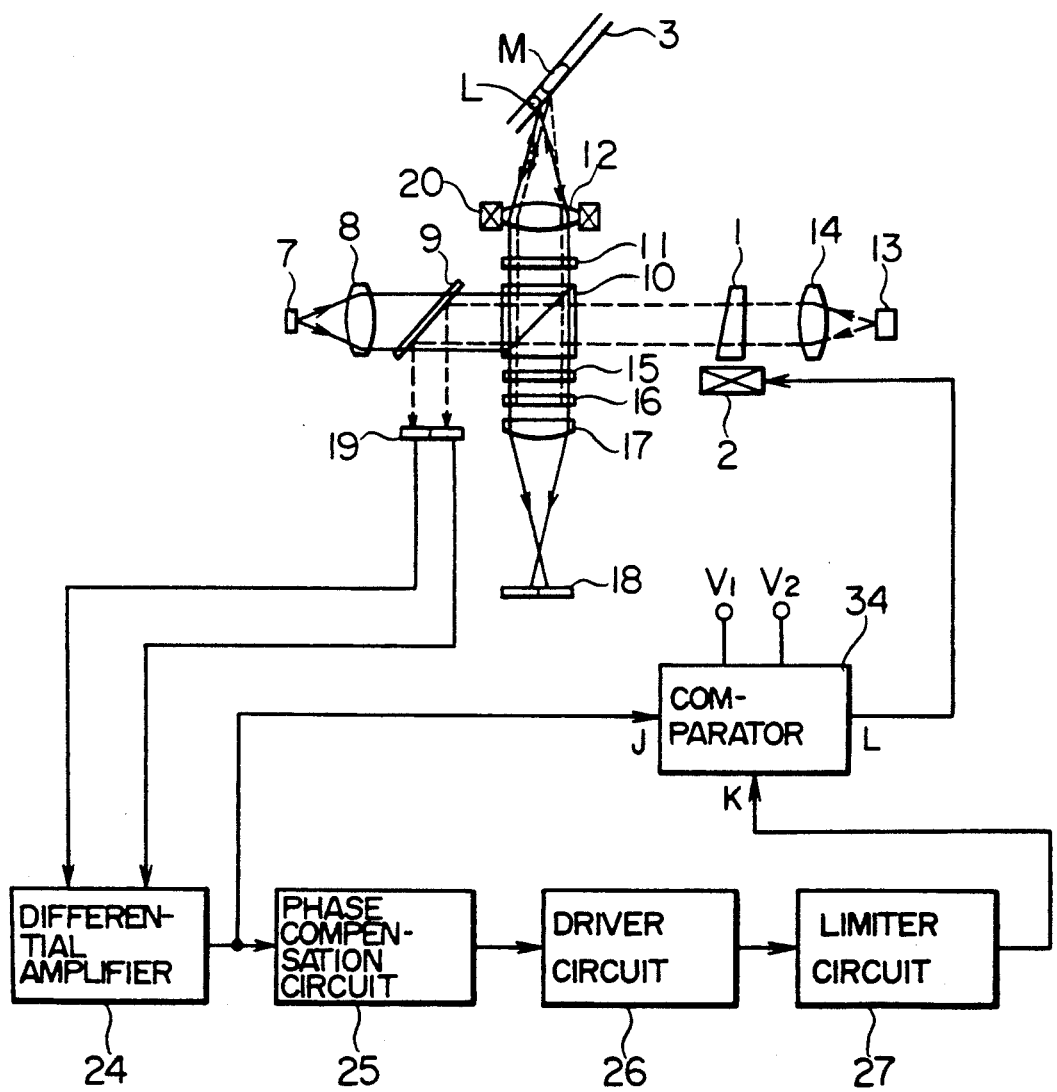

FIG. 13 shows an eleventh embodiment in which the drive voltage is reset to zero instead of deactivating the erasing laser. The $TE_M$ produced by the differential amplifier 24 is applied to the comparator 34. When $-V_1\leq TE_M\leq V_2$, the comparator 34 outputs the output of the limiter circuit 27 as it is at a terminal L, and when $TE_M\leq -V_1$ or $TE_M\geq V_2$, the comparator produces, at the terminal L, zero output irrespective of the output of the limiter circuit 27. Accordingly, if $V_1$ and $V_2$ are appropriately set as shown in FIG. 10, the drive voltage of the drive element is reset to zero before the deviation of the erasing spot M from the target track reaches one half of the track pitch. Accordingly, the tracking error signal is always for the target track, and a track other than the target track is prevented from being scanned by the light spot M and therefore from being miserased.

Figure 14:
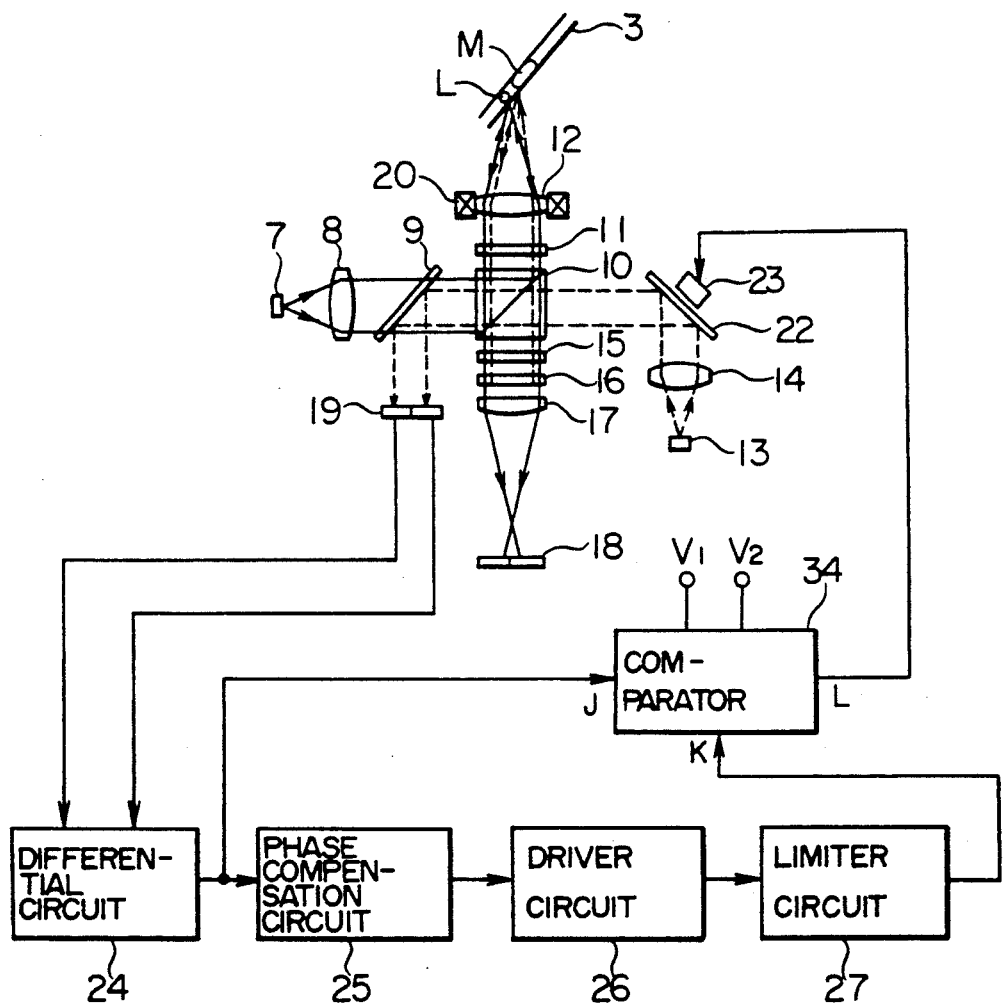

FIG. 14 shows a twelveth embodiment which uses a rotatable mirror. The same advantage as that of the eleventh embodiment is attained.

In the above embodiments, the limiter circuit 27 is a voltage limit circuit. Alternatively, it may be a current limit circuit. The device for moving the light spot is prism or rotatable mirror, but it may be other drive device, such as a device for moving the erasing light source 13 by a piezoelectric element.

In the above embodiments, the tracking control of the erasing light spot M in the two-spot optical recording and reproducing apparatus has been explained. Alternatively, the light spot M may be a recording or reproducing light spot, or a multi-spot apparatus may be used.

In accordance with the present invention, the predetermined light spot is controlled not to scan tracks other than the target track even if an external disturbance is applied, and scanning and therefore miserasing (and misrecording or misreproducing) a track other than the target track by the light spot is prevented.

What is claimed is:

1. An optical recording and reproducing apparatus having a plurality of light spots, comprising:

light spot forming means for forming at least a first light spot and a second light spot on one track of an optical recording medium, first deviation detection means for detecting a first deviation of the first light spot from said track, first drive means for moving the first light spot and the second light spot together in accordance with the first deviation, second deviation detection means for detecting a second deviation of the second light spot from said track, second drive means for moving the second light spot relative to the first light spot in accordance with the second deviation, said second drive means including a driver circuit, responsive to said second deviation detection means, for providing a drive signal indicating a magnitude of said second deviation, and limit means for limiting the value of said drive signal within a predetermined range to limit a movable range of the second light spot to less than one half of a track pitch, normal to said track, from the position of the second light spot when said second drive means is at a neutral position.

2. An optical recording and reproducing apparatus according to claim 1, wherein said limit means is an electrical means.

3. An optical recording and reproducing apparatus according to claim 1 further comprising means for stopping light emission of the second light spot when the second deviation exceeds a predetermined amount.

4. An optical recording and reproducing apparatus according to claim 1 further comprising means for returning said second drive means to a neutral position when the second deviation exceeds a predetermined amount.

* * * * *